US008254961B2

(12) United States Patent
Moon et al.

(10) Patent No.: US 8,254,961 B2
(45) Date of Patent: Aug. 28, 2012

(54) RETAIL-RELATED SERVICES FOR MOBILE DEVICES

(75) Inventors: Hannah Y. Moon, Boston, MA (US); D. Beau Morley, Somerville, MA (US); Andrew J. Afram, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1103 days.

(21) Appl. No.: 11/877,022

(22) Filed: Oct. 23, 2007

(65) Prior Publication Data
US 2009/0104920 A1 Apr. 23, 2009

(51) Int. Cl.
*H04W 24/00* (2009.01)
(52) U.S. Cl. ............... 455/456.3; 455/456.1; 455/414.1; 455/407; 455/418; 709/203
(58) Field of Classification Search ............... 455/414.1, 455/456.3, 456.1, 407, 418; 709/203
See application file for complete search history.

(56) References Cited

U.S. PATENT DOCUMENTS

| | | | | |
|---|---|---|---|---|
| 6,091,956 | A * | 7/2000 | Hollenberg | 455/456.5 |
| 7,526,278 | B2 * | 4/2009 | Link et al. | 455/414.1 |
| 7,532,899 | B2 * | 5/2009 | Wilson et al. | 455/456.3 |
| 7,697,943 | B2 * | 4/2010 | Jung | 455/456.3 |
| 2003/0100315 | A1 * | 5/2003 | Rankin | 455/456 |
| 2004/0023666 | A1 * | 2/2004 | Moon et al. | 455/456.1 |
| 2004/0237109 | A1 * | 11/2004 | Laitinen et al. | 725/62 |
| 2005/0136949 | A1 * | 6/2005 | Barnes | 455/461 |
| 2005/0221807 | A1 * | 10/2005 | Karlsson et al. | 455/418 |
| 2005/0256781 | A1 * | 11/2005 | Sands et al. | 705/26 |
| 2006/0041443 | A1 * | 2/2006 | Horvath, Jr. | 705/1 |
| 2006/0089160 | A1 * | 4/2006 | Othmer | 455/457 |
| 2007/0087731 | A1 * | 4/2007 | Karlsson et al. | 455/414.1 |
| 2007/0191026 | A1 * | 8/2007 | Teplitsky | 455/456.3 |
| 2008/0076418 | A1 * | 3/2008 | Beyer, Jr. | 455/435.1 |
| 2008/0160966 | A1 * | 7/2008 | McKiou et al. | 455/414.1 |
| 2008/0182587 | A1 * | 7/2008 | Bennett | 455/456.2 |
| 2009/0005021 | A1 * | 1/2009 | Forstall et al. | 455/414.3 |

OTHER PUBLICATIONS

L. Story, "Brokering a Deal, Carefully, Between Malls and the Web", New York Times, Oct. 18, 2007, 2 pages, http://bits.blogs.nytimes.com/2007/10/18/brokering-a-deal-carefully-between- malls-and-the-web/.

* cited by examiner

Primary Examiner — Kamran Afshar
Assistant Examiner — Mong-Thuy Tran

(57) ABSTRACT

A system identifies a location of a user based on a location of a mobile device associated with the user, associates the location of the user to a location having a collection of attractions relating to shopping or entertainment, retrieves layout information associated with the location having the collection of attractions, and provides the layout information to the user on the mobile device.

19 Claims, 13 Drawing Sheets

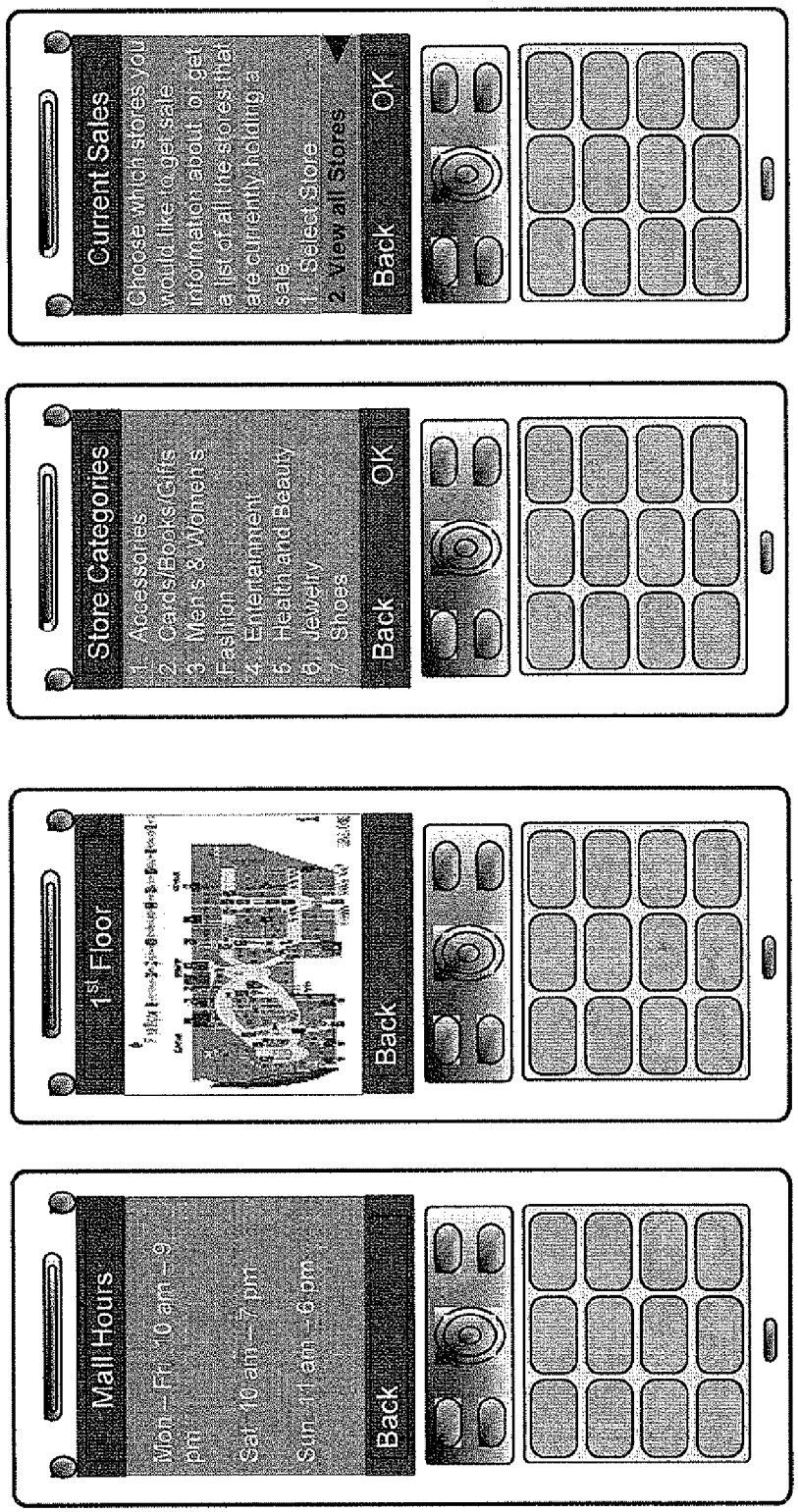

_US 8,254,961 B2_

RETAIL-RELATED SERVICES FOR MOBILE DEVICES

BACKGROUND

Currently, when consumers go to a mall, they may need to find an information kiosk or a directory to obtain, for example, a list of retailers that do business in the mall or a floor plan of the mall. Additionally, consumers may have to walk around the mall to see which retailers may be having a sale since there is typically no single source in the mall that compiles all this information. Therefore, consumers may have to spend a significant amount of time not only figuring out where an information kiosk or a directory may be located, but also which retailers may be having a sale.

DETAILED DESCRIPTION OF PREFERRED EMBODIMENTS

The following detailed description refers to the accompanying drawings. The same reference numbers in different drawings may identify the same or similar elements. Also, the following description does not limit the invention. The terms "consumer," "customer," and "user," may be used interchangeably depending on context.

Implementations described herein may provide a system that facilitates shopping and/or some other activity (e.g., going to an amusement park or a theme park). The system may include a backend component, such as a network, and a front end component, such as a user interface. The user interface may allow a user to interact with the network and services described herein.

Figure 1:
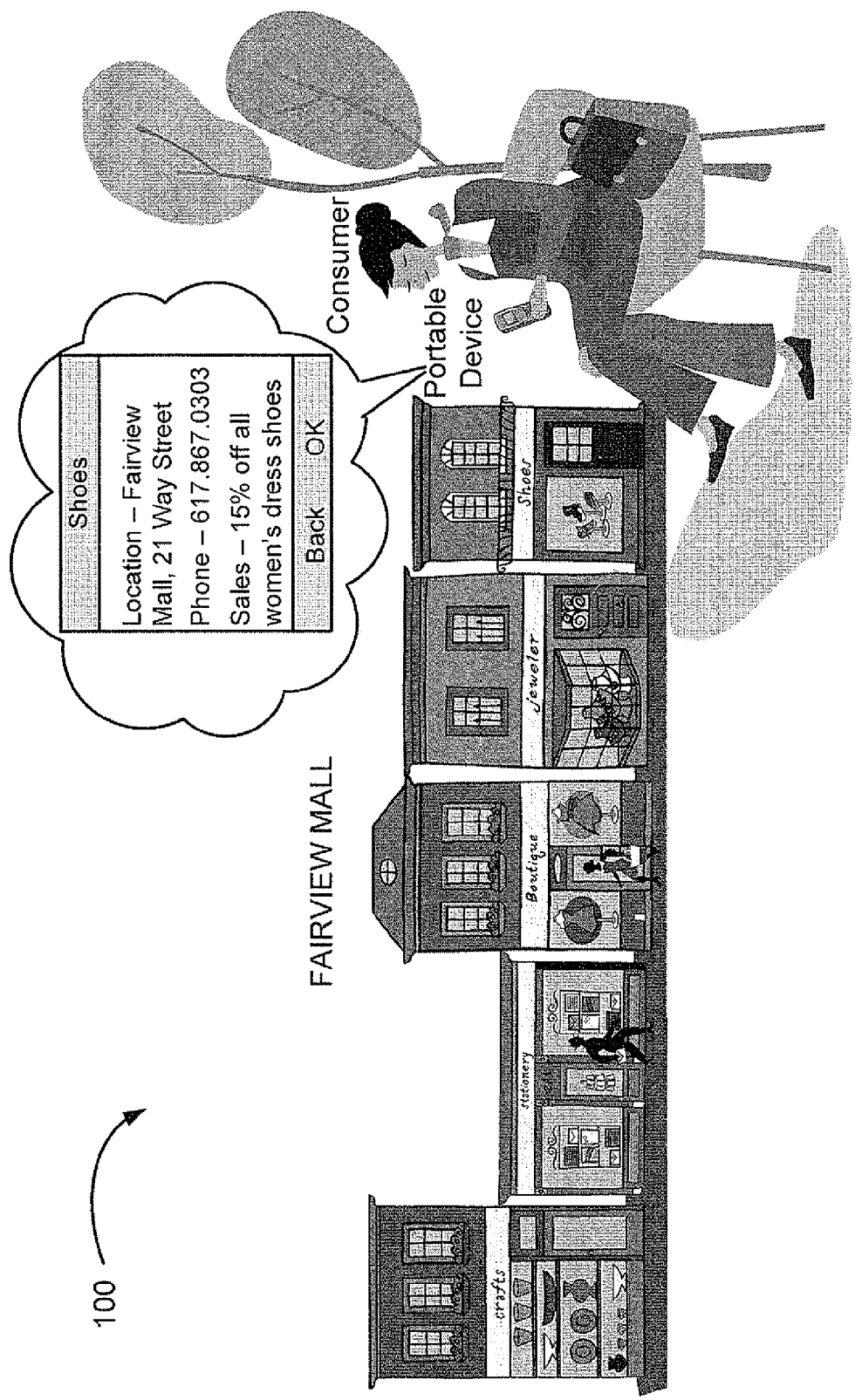
FIG. 1 is a diagram illustrating concepts described herein.

FIG. 1 is a diagram illustrating concepts described herein. As illustrated, an exemplary environment 100 may include a consumer nearby an outdoor mall, such as Fairview mall. The consumer may be carrying a portable device, such as a mobile phone. The location of the mobile phone may be determined based on, for example, a Global Positioning System (GPS) or mobile phone localization. A backend component (not shown), such as a network, may associate the mobile phone location with a geographic location of the outdoor mall. In other instances, the consumer may provide inputs to the mobile device, such as, for example, an address of the outdoor mall or some other mall location identifier (e.g., a code). Thus, for example, the services described herein may relate to an outdoor mall that the consumer has visited before (e.g., a user may provide an address of the previously visited outdoor mall), or an outdoor mall that the consumer has not visited before (e.g., one or more mall locations may be suggested to the consumer based on the consumer's determined location).

In this scenario, the consumer may receive kiosk information (e.g., a street layout of stores, addresses, telephone numbers, store hours, a list of stores, inventory for each store, etc.) and/or promotional information (e.g., sale information, coupons, incentive programs, etc.) via the mobile phone. This service may also be appealing to retailers since it may provide a mechanism in which to communicate with a customer that may be in the vicinity of the retailers' stores. For example, retailers may personalize their advertising to a customer, as well as provide a customer with store-related information more readily.

As a result of the foregoing, a consumer's shopping experience may be less burdensome and more enjoyable. Additionally, retailers may provide their customers with a wealth of information and may reach an increasing number of customers as more and more customers carry portable devices, such as mobile phones. Since environment 100 has been partially described, variations to the above will be discussed further below.

Figure 2:
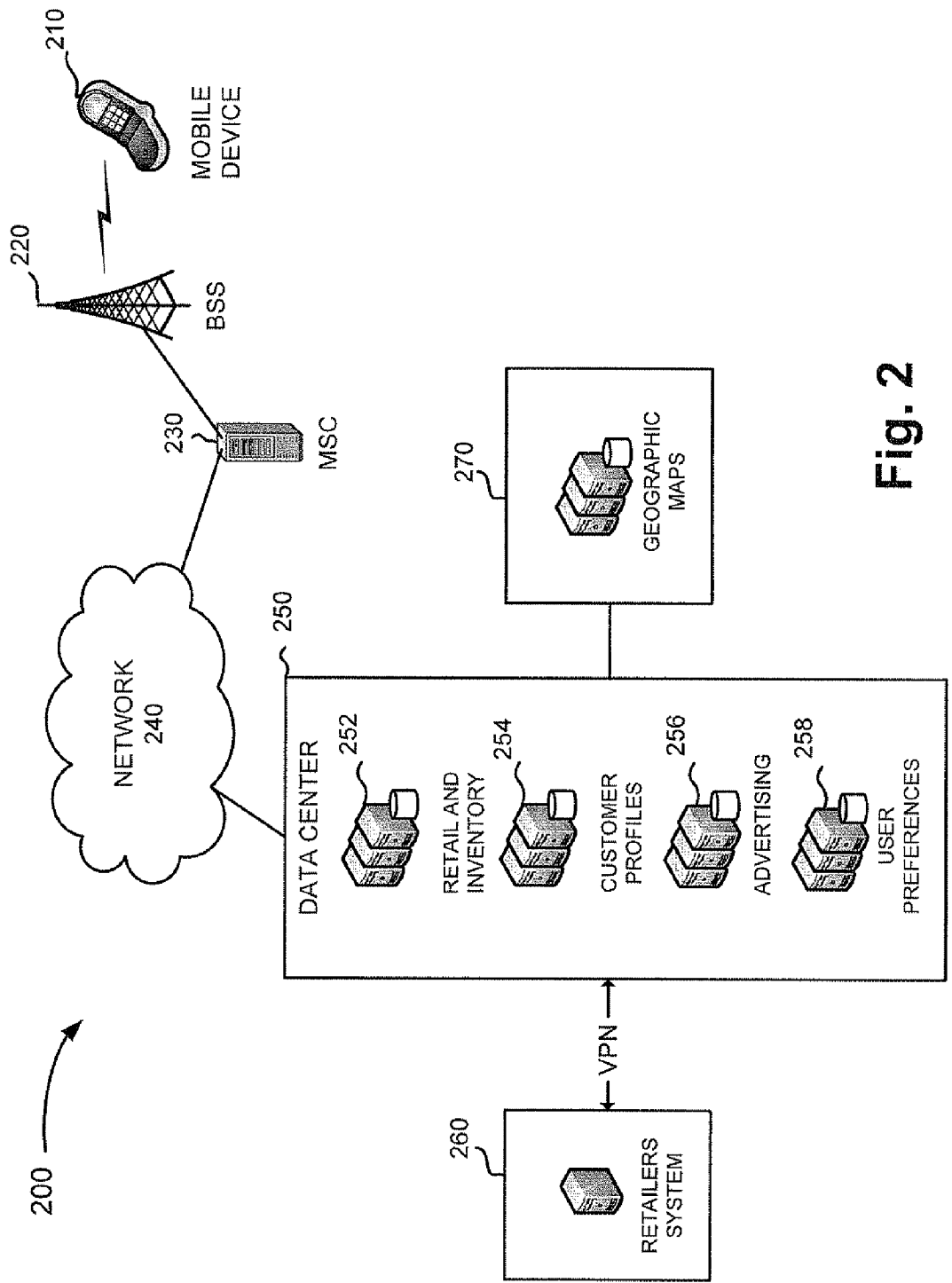
FIG. 2 is a diagram illustrating an exemplary environment in which systems and methods described herein may be implemented.

FIG. 2 is a diagram illustrating an exemplary environment 200 in which systems and methods described herein may be implemented. Environment 200 may include a mobile device 210, a base station system (BSS) 220, a mobile switching center (MSC) 230, a network 240, a data center 250, a retailers system 260, and a geographic maps device 270.

Mobile device 210 may include, for example, a radiotelephone, a personal communications system (PCS) terminal that may combine a cellular radiotelephone with data processing, a facsimile, and data communications capabilities, a personal digital assistant (PDA) that may include a radiotelephone, pager, Internet/intranet access, web browser, organizer, calendar, a Doppler receiver, and/or a GPS receiver, a lap top, or another type of computation or communication device, a process running on one of these devices, and/or an object executable by one of these devices.

In one implementation, mobile device 210 may include an interactive component (not illustrated). For example, the interactive component may include a user interface. The user interface may, for example, be downloaded to mobile device 210 as an application (e.g., using an environment, such as Binary Runtime Environment for Wireless (BREW) or Flash Lite). The download and installation may occur if a user learns about the service through an advertisement (e.g., via mobile device 210 or a sign at a mall) or from a friend. In such instances, the user interface may be downloaded through a download interface provided by a network service provider. In other instances, the user interface be accessed within environment 200 (e.g., a network) using mobile web technology which requires no downloadable component. In still other instances, the user interface may come pre-installed on mobile device 210. In one implementation, the user interface may be presented to a user as a web page.

A user of mobile device 210 may receive, manage and/or transmit various types of information based on the interactive component. The interactive component may provide customized layouts of information to a user, depending on, for example, the type of mobile device 210 and/or preferences of a user. The interactive component may be user-configurable. Exemplary screenshots of the interactive component are described further below in connection with FIGS. 9A-9N. The interactive component may also include or operate cooperatively with a voice recognition system. In this way, a user of mobile device 210 may enjoy the various services described herein in a hands-free environment (e.g., via the voice recognition system).

BSS 220 may connect to mobile device 210. BSS 220 may include a transceiving device to provide radio communication. For example, BSS 220 may include a base transceiver station (BTS) and/or a base station controller (BSC). BSS 220 may control traffic and signaling with a mobile device, such as mobile device 210. BSS 220 may perform, for example, transcoding (e.g., compression and data rate adaptation) of speech channels, spectrum filtering, queue management, handover operations, allocation of radio channels to mobile device 210, paging, quality management of transmission and reception, and/or many other tasks related to communication over a radio network.

MSC 230 may connect to BSS 220 and network 240. MSC 230 may include an intelligent switching system. MSC 230 may perform mobility management and various services, such as setting up calls to and from mobile devices, location updating, common channel signaling, charging and real time account monitoring, and/or providing an interface to external networks. MSC 230 may include various databases, such as a home location register (HLR), a visitor location register (VLR), an authentication center, and/or an equipment identity register (EIR).

Network 240 may connect to MSC 230 and data center 250. Network 240 may include, for example, a local area network (LAN), a wide area network (WAN), the Internet, an intranet, a telephone network (e.g., the Public Switched Telephone Network (PSTN)), any other type of network, and/or a combination of networks.

Data center 250 may connect to network 240, retailers system 260, and/or geographic maps device 270. Data center 250 may include devices to manage and/or store information associated with the concepts described herein. As depicted in FIG. 2, data center 250 may include a retail and inventory device 252, a customer profiles device 254, an advertising device 256, and/or a user preferences device 258.

Retail and inventory device 252 may include a device that may store information related to malls, retail outlets, shopping centers, individual stores, and/or other information that may be useful to a consumer. In one implementation, retail and inventory device 252 may include a retail and inventory database. The retail and inventory database may be implemented as a single database or as multiple databases.

Figure 3:
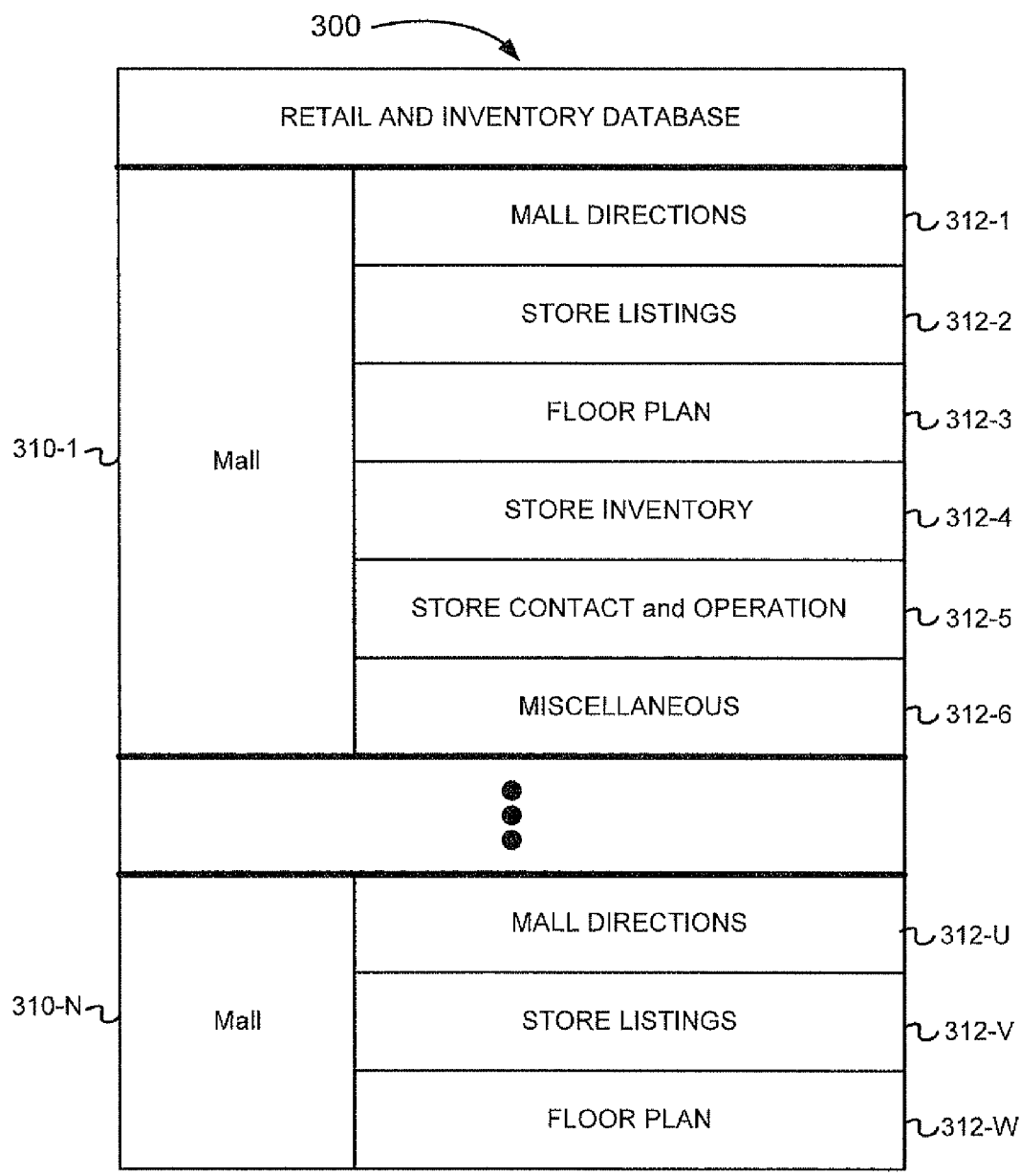
FIG. 3 is a diagram illustrating an exemplary retail and inventory database that may be implemented by a retail and inventory device of the exemplary environment depicted in FIG. 2.

FIG. 3 is a diagram illustrating an exemplary retail and inventory database 300 that may be implemented by retail and inventory device 252. For example, retail and inventory database 300 may include a list of mall entries 310-1 to 310-N (collectively referred to as "mall entries 310"). In one implementation, each of mall entries 310 may include a number of fields. For example, each of mall entries 310 may include mall information fields, such as a mall directions field 312-1 (e.g., map information, and/or driving directions), a store listings field 312-2 (e.g., an alphabetical listing of stores and/or a listing of stores by category), and a floor plans field 312-3 (e.g., a floor plan of a mall, a street layout of shopping district). Each of mall entries 310 may also include individual store information fields, such as a store inventory field 312-4 (e.g., a list of goods and/or material available in stock, brands, images of inventory, prices, bar codes, stock keeping units (SKU) identifiers, etc.), a store contact and operation information field 312-5 (e.g., address, telephone number, e-mail, fax number, etc., and/or a store hours), and/or other types of store information, such as a miscellaneous field 312-6 (e.g., special services, delivery services, employment opportunities, store credit card offers, etc.).

Returning to FIG. 2, customer profiles device 254 may include a device that may store information related to a customer. For example, customer profiles device 254 may include customer profile information and/or household information. In one implementation, customer profiles device 254 may include a customer profiles database. The customer profiles database may be implemented as a single database or as multiple databases.

Figure 4:
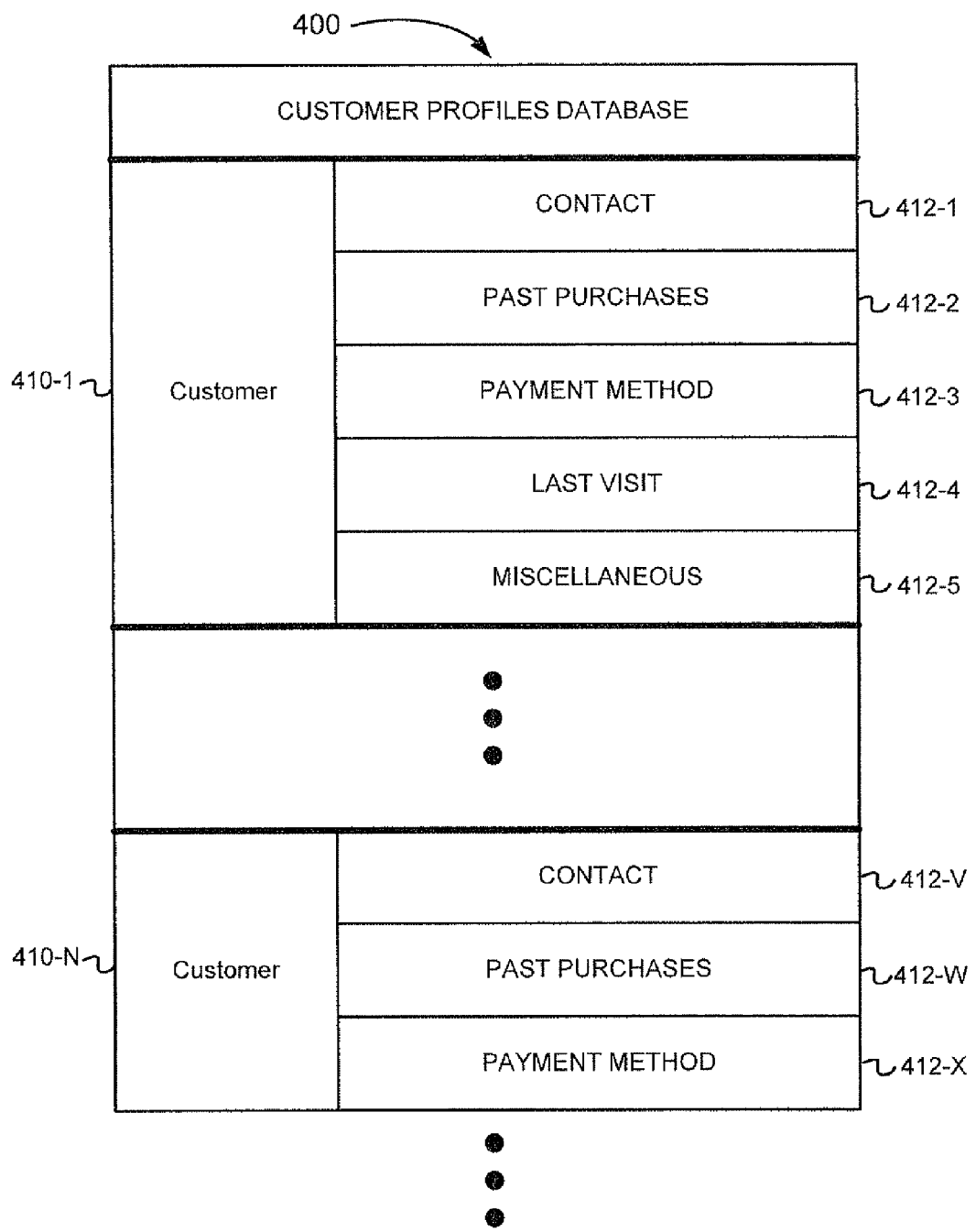
FIG. 4 is a diagram illustrating an exemplary customer profiles database that may be implemented by a customer profiles device of the exemplary environment depicted in FIG. 2.

FIG. 4 is a diagram illustrating an exemplary customer profiles database 400 that may be implemented by customer profiles device 254. For example, customer profiles database 400 may include customer profile information 410-1 to 410-N (collectively referred to as "customer profile information 410") related to a retailer. For example, customer profile information 410 may include information gleaned from transactions with a customer, such as a contact information field 412-1 (e.g., name, address, telephone number, e-mail address, etc.), a past purchases field 412-2 (e.g., items purchased, amount spent), a payment methods field 412-3 (e.g., cash, credit card, debit card, store credit card, etc.), a last visit field 412-4 (e.g., day and time of last visit at store), and/or a miscellaneous field 412-5 (e.g., household information, income level, profession, store card holder, etc.).

Returning to FIG. 2, advertising device 256 may include a device that may store information related to advertisements. In one implementation, advertising device 256 may include an advertising database. The advertising database may be implemented as a single database or as multiple databases.

Figure 5:
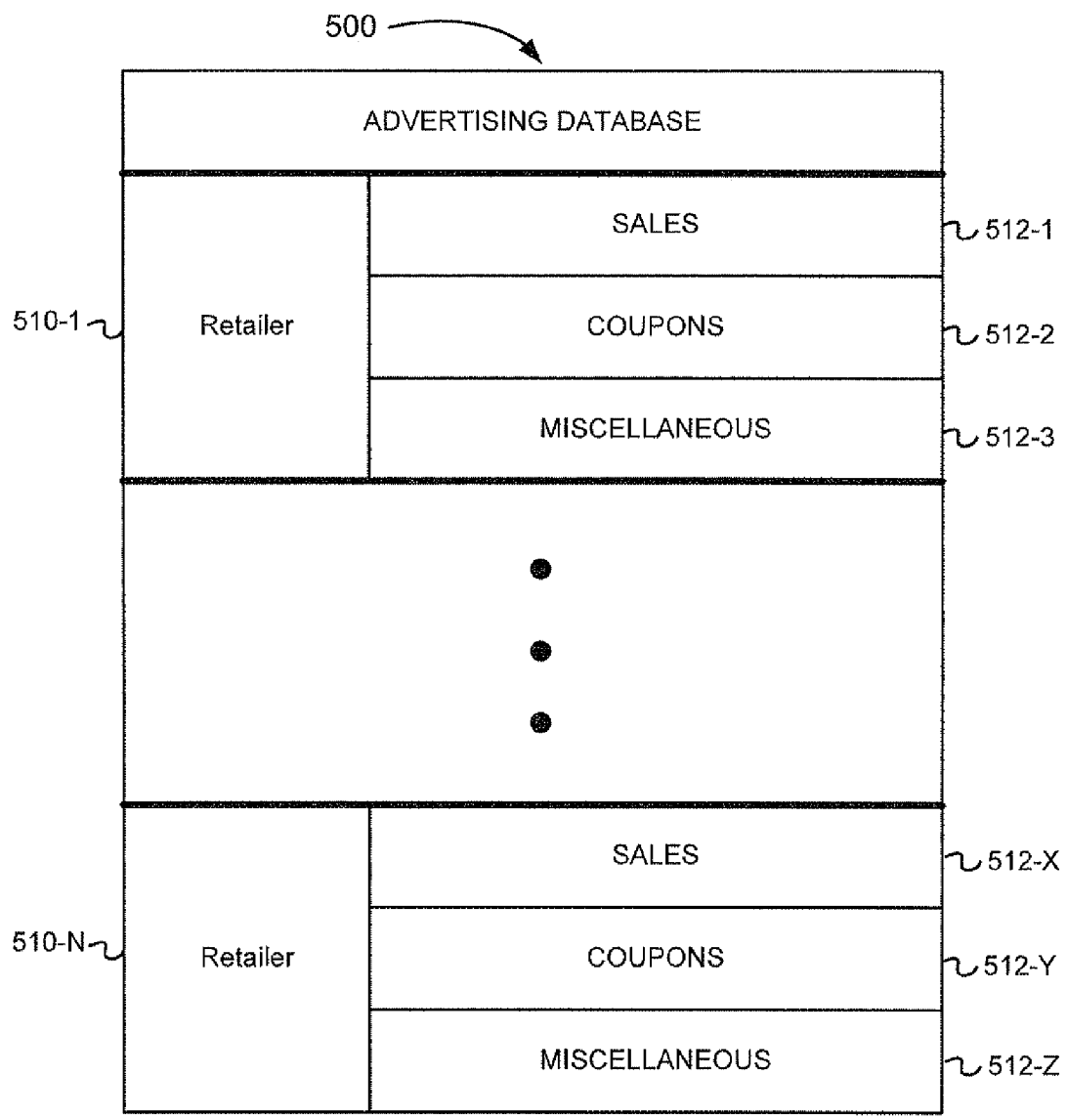
FIG. 5 is a diagram illustrating an exemplary advertising database that may be implemented by an advertising device of the exemplary environment depicted in FIG. 2.

FIG. 5 is a diagram illustrating an exemplary advertising database 500 that may be implemented by advertising device 256. For example, advertising database 500 may include a list of retailer entries 510-1 to 510-N (collectively referred to as "retailer entries 510"). In one implementation, each retailer entry 510 may include a number of fields. For example, each retailer entry 510 may include advertising information fields, such as a sales field 512-1 (e.g., electronic flyers including information relating to sale prices, discounts, two-for-one offers, etc.), a coupons field 512-2 (e.g., coupons, rebates, etc.), and/or a miscellaneous field 512-3 (e.g., electronic flyers including information relating to up-coming holiday specials, special events, incentive and reward programs, etc.).

Returning to FIG. 2, user preferences device 258 may include a device that may store information associated with a user's preferences. In one implementation, user preferences device 258 may include a user preferences database. The user preferences database may be implemented as a single database or as multiple databases.

Figure 6:
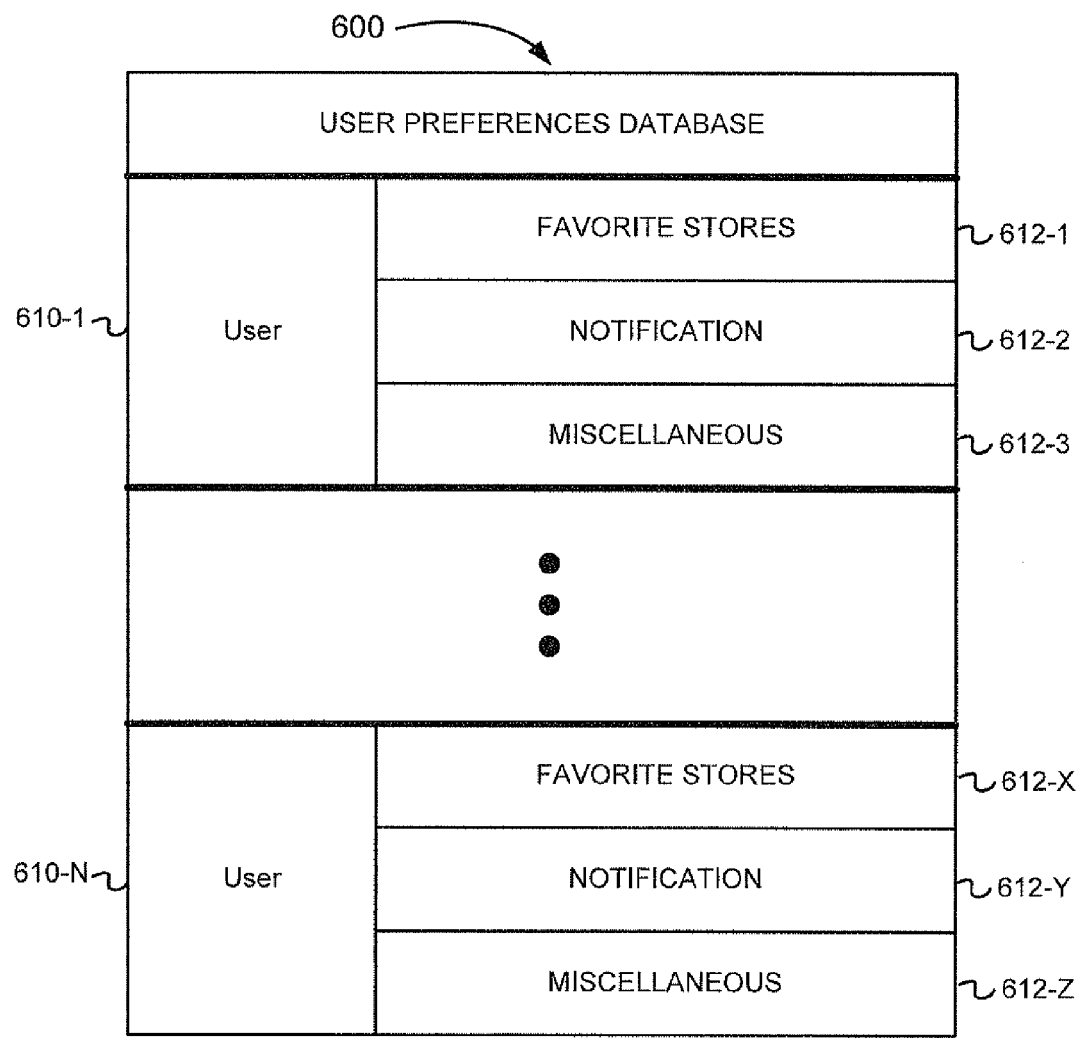
FIG. 6 is a diagram illustrating an exemplary user preferences database that may be implemented by a user preferences device of the exemplary environment depicted in FIG. 2.

FIG. 6 is a diagram illustrating an exemplary user preferences database 600 that may be implemented by user preferences device 258. For example, user preferences database 600 may include a list of user entries 610-1 to 610-N (collectively referred to as "user entries 610"). In one implementation, each user entry 610 may include a number of fields. For example, each user entry 610 may include preference information fields, such as a favorite stores field 612-1 (e.g., a list of names of favorite stores or malls, code information of a mall or a store (e.g., an identification number), etc.), and/or a notification field 612-2. In one example, notification field 612-2 may store user settings (e.g., an opt-in or an opt-out setting relating to receiving advertisements or other information from a retailer), how a user would like to be notified of certain events (e.g., an auditory notification, an e-mail notification, a text message notification, etc.), and/or a distance setting that indicates how close, for example, a mall must be to the user in order for the interactive component of mobile device 210 to suggest the mall. Additionally, or alternatively, user preferences database 600 may include a miscellaneous field 612-3 (e.g., a workspace for a user to store certain things.) For example, a user may store in the workspace a list of items to be purchased, gift lists, wish lists, receipts of purchases, coupons, rebates, etc. Accordingly, a user of mobile device 210 may manage certain information associated with user preferences device 258.

Returning to FIG. 2, in one implementation, retailers system 260 may not have access to user preferences device 258 and/or any databases associated therewith. In other implementations, retailers system 260 may have some access to user preference device 258. For example, retailers system 260 may have access to user preferences database 600, such as favorite stores field 612-1. For example, retailers system 260 may send an alert of a special offer to a customer via mobile device 210 based on the customer's selection of the retailer as a favorite retailer that is stored in favorite stores field 612-1.

Retailers system 260 may connect to data center 250. Retailers system 260 may include a device that allows access to data center 250. For example, retailers may use retailers system 260 to access data center 250. In such an instance, an employee of a store may manage information of retail and inventory device 252, customer profiles device 254, advertising device 256, user preferences device 258, and/or the databases associated therewith via a virtual private network (VPN). For example, the employee of a store may manage devices in data center 250 using a computer. Additionally, or alternatively, retailers system 260 may update information through e-mail, fax, etc.

Geographic maps device 270 may connect to data center 250. Geographic maps device 270 may include a device that associates a user's location to another location, such as a mall. In one implementation, geographic maps device 270 may include, for example, geographic coordinates, address, and/or other location identifiers that may be compared to a geographic location of mobile device 210 (i.e., of a user).

In one implementation, a user may store, for example, mall code identifiers on geographic maps device 270. Additionally, or alternatively, geographic maps device 270 may compare the location of the user to, for example, geographic coordinates related to one or more malls to determine which mall the user is near. Based on this association, a user may access, manage, and/or retrieve information from, for example, data center 250, as described herein.

Although, FIG. 2 illustrates exemplary environment 200, in other implementations, environment 200 may include fewer, additional, and/or different devices than depicted in FIG. 2. For example, certain devices may be combined into a single device, and/or a device may be implemented as two or more devices. Additionally, the connections between devices may be direct or indirect. Further, the connections may be, for example, wired and/or wireless. Additionally, the databases described herein are exemplary and may include fewer, additional, and/or different information.

Figure 7:
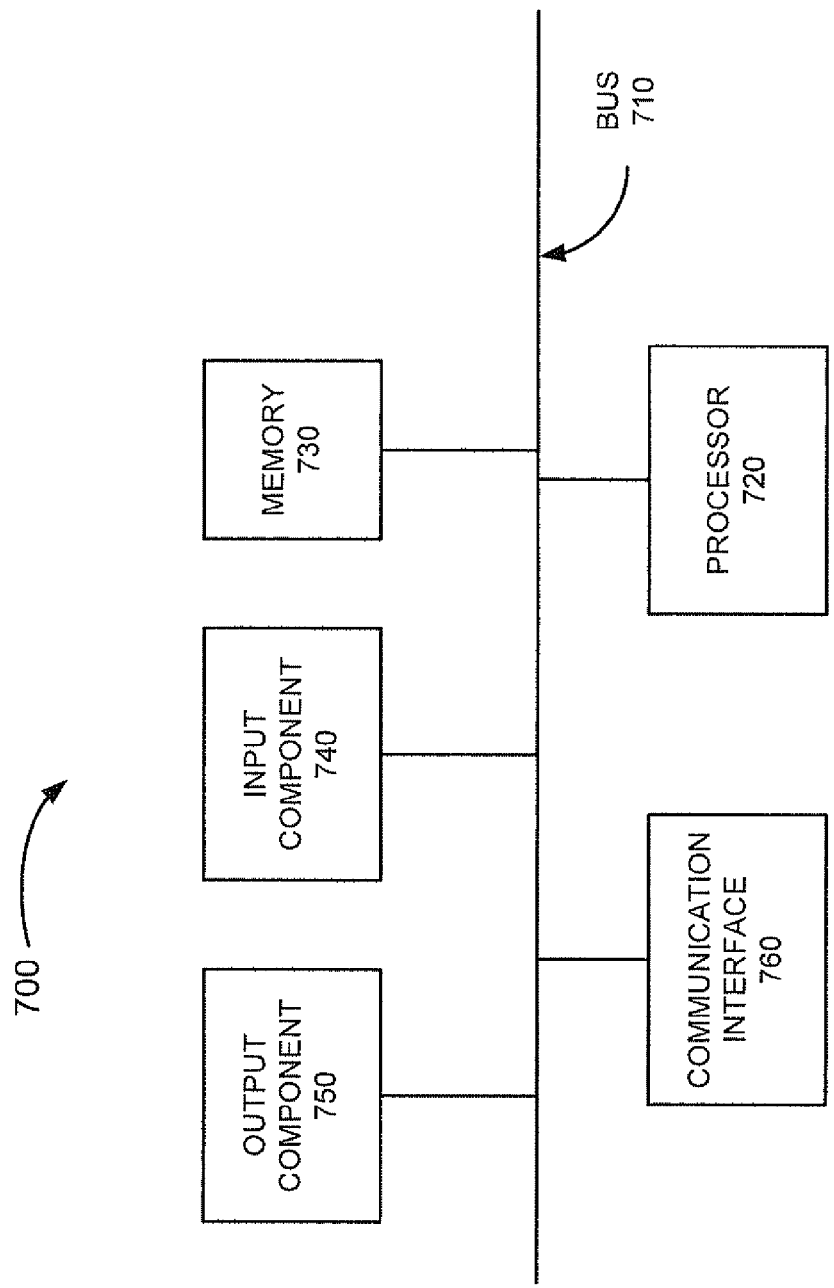
FIG. 7 is a diagram illustrating exemplary components of the devices of the exemplary environment depicted in FIG. 2.

FIG. 7 is a diagram illustrating exemplary components of a device 700 that may correspond to any of the devices depicted in FIG. 2. For example, device 700 may correspond to mobile device 210, BSS 220, MSC 230, retail and inventory device 252, customer profiles device 254, advertising device 256, user preferences device 258, retailers system 260, and/or geographic maps device 270. As illustrated, device 700 may include a bus 710, a processor 720, memory 730, an input component 740, an output component 750, and/or a communication interface 760.

Bus 710 may include a path that permits communication among the components of device 700. For example, bus 710 may include a system bus, an address bus, a data bus, and/or a control bus. Bus 710 may also include bus drivers, bus arbiters, bus interfaces, and/or clocks.

Processor 720 may include a general-purpose processor, a microprocessor, a data processor, a co-processor, a network processor, an application specific integrated circuit (ASIC), a controller, a programmable logic device, a chipset, a field programmable gate array (FPGA), or processing logic that may interpret and execute instructions. "Processing logic," as used herein, may include hardware, software, and/or a combination of hardware and software.

Memory 730 may include any type of storage component that stores data and instructions related to the operation and use of device 700. For example, memory 730 may include a memory component, such as a random access memory (RAM), a dynamic random access memory (DRAM), a static random access memory (SRAM), a synchronous dynamic random access memory (SRAM), a ferroelectric random access memory (FRAM), a read only memory (ROM), a programmable read only memory (PROM), an erasable programmable read only memory (EPROM), an electrically erasable read only memory (EEPROM), and/or a flash memory. Additionally, memory 730 may include a storage component, such as a magnetic storage component (e.g., a hard drive), a CD drive, a DVD drive, or another type of computer-readable medium. Memory 730 may also include an external storing component, such as a USB memory stick, a digital camera memory card, and/or a Subscriber Identity Module (SIM) card.

Input component 740 may include a mechanism that permits an operator to input information to device 700, such as a keyboard, a keypad, a button, a switch, voice recognition, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, a radio interface, or the like.

As will be described in detail below, device 700 may perform certain operations relating to the system and services described herein. Device 700 may perform these operations in response to processor 720 executing software instructions contained in a computer-readable medium, such as memory 730. A computer-readable medium may be defined as a physical or logical memory device.

The software instructions may be read into memory 730 from another computer-readable medium or from another device via communication interface 760. The software instructions contained in memory 730 may cause processor 720 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 7 illustrates exemplary components of device 700, in other implementations, device 700 may include fewer, additional, and/or different components than those depicted in FIG. 7. In still other implementations, one or more components of device 700 may perform one or more other tasks described as being performed by one or more other components of device 700.

Figure 8:
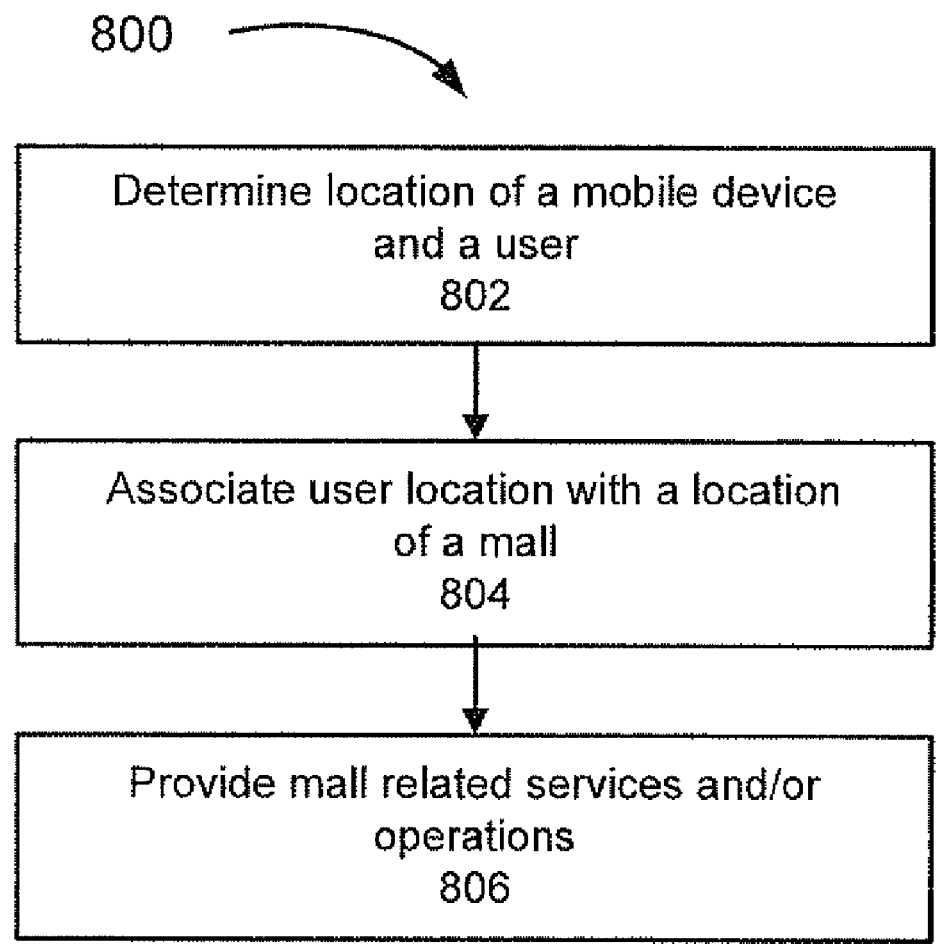
FIG. 8 is a flow diagram illustrating exemplary operations associated with the concepts described herein.

FIG. 8 is a flow diagram illustrating exemplary operations associated with the concepts described herein. One or more processes described in relation to the blocks depicted in FIG. 8 may be performed by one or more of the devices depicted in FIG. 2. For purposes of discussion in reference to FIG. 8, assume that mobile device 210 includes a pre-installed user interface, such as the interactive component. Further, assume that a user of mobile device 210 is utilizing the interactive component.

Process 800 may include determining the location of a mobile device and a user (block 802). For example, the location of a mobile device, such as mobile device 210, may be based on a GPS system, via a GPS receiver provided in mobile device 210. Although not illustrated in FIG. 2, a GPS system (e.g., GPS satellites) may be employed and may work cooperatively with the devices of environment 200. Additionally, or alternatively, the location of mobile device 210 may be determined based on BSS 220. For example, base stations of BSS 220 may determine a location of mobile device 210 based on comparative signal strengths from mobile device 210 and/or cell identification. Additionally, or alternatively, a user may provide location information (e.g., a street, a city, a postal code, etc.) to the interactive component, which may provide a basis to determine the location of mobile device 210.

Identification of a user may be based on identification of mobile device 210. Identification of mobile device 210 may be based on, for example, an electronic serial number (ESN) and/or a mobile identification number (MIN). In this way, the location of mobile device 210 and the identification of mobile device 210 may be utilized to determine the user's location and/or the identity of the user.

As further illustrated in FIG. 8, the location of a user may be associated with a location of a mall (block 804). For example, geographic maps device 270 may include geographic information (e.g., locations of malls, location of strip malls, shopping districts, etc.). In one implementation, the location of a user may be compared with geographic information to determine a mall near the user's location.

For example, if a user is traveling in a new geographic area, or a user has not saved, for example, a mall address or mall code, the location of a user may be compared to, for example, geographic information contained in geographic maps device 270. In this way, geographic maps device 270 may determine a location of a mall that is near the user's location.

Additionally, or alternatively, a user may have previously saved a mall address and/or mall code information in geographic maps device 270 and/or favorite stores field 612-1 of user preferences database 600. Thus, in instances when a user provides a mall code, geographic maps device 270 may make an association of the user's location to a mall corresponding to the mall code identifier. In such an instance, the location of the user may be associated with a saved mall address and/or mall code. In other instances, the user may input, for example, a postal code of a mall, which may be utilized to associate the user's location with a location of a mall.

In some instances, a user may specify a certain distance (e.g., in notification field 612-2 of user preferences database 600) from which a location of a mall may be determined from the user. For example, the service may associate the location of user relative to more than one mall location based on a specified, maximum distance from the user.

As described herein, a location of a mall is exemplary. That is, a location of a store, a location of a local strip mall, a location of a shopping district (e.g., Newbury Street in Boston, Rodeo Drive in Los Angeles, Union Square in San Francisco, etc.), a location of an amusement park or a theme park, etc. may be employed as a location to be associated with a user's location. Further, if an association is made between a user's location and a mall location, the interactive component of mobile device 210 may present a result to the user. For example, the interactive component may provide a user with a name of a mall. The user may request more details related to the mall, as described herein.

As further illustrated in FIG. 8, mall-related services and/or operations may be provided (block 806). For example, a user may request various types of information, and one or more devices in environment 200 may retrieve information in response to the request. In one implementation, a user may input a query to the interactive component and may retrieve and/or access information from retail and inventory database 300, such as mall directions, store listings, floor plans, store inventory, store contact information, store hours, and/or other types of miscellaneous information previously described. Additionally, or alternatively, the interactive component may provide a user with information from user preferences database 600, such as receipts or coupons, etc., as previously described.

In addition to the above, more exotic queries may be employed based on the concepts described herein. For example, assume a customer may be in a store (e.g., Macy's) and finds a dress to purchase. However, Macy's does not carry the dress in her size. In this instance, the customer may take a picture of the bar code with her mobile device 210 and have a search conducted to locate the closest Macy's that might have the dress in the desired size based on the picture of the bar code. For example, the interactive component of mobile device 210 may locate a dress in a desired size from, for example, store inventory field 312-4 of retail and inventory database 300.

Additionally, for example, a customer may request that a retailer provide their most recent coupons. In such an instance, for example, a coupon from coupons field 512-2 of advertising database 500 may be transmitted to miscellaneous field 612-3 of user preferences database 600 based on a customer's request, via the interactive component.

In other instances, a customer may request that a retailer, after purchasing an item, provide an electronic copy of a receipt associated with the transaction. In one implementation, retailers system 260 may transmit the receipt to a customer's e-mail address, or may transmit a text message (e.g., a Multimedia Messaging Service (MMS) message) to mobile device 210. In another implementation, retailers system 260 may transmit the receipt to user preferences database 600. In this way, a customer may always have access to a receipt (e.g., in case the customer may need to return an item later), and avoid ever misplacing or losing a receipt. In other implementations, retailers system 260 may transmit a short message service (SMS) message to indicate to the customer that a receipt has been sent to the customer's user preference database 600. As a result, use of memory on mobile device 210 may be minimized and the customer may obtain a confirmation that a receipt has been tendered.

Additionally, or alternatively, retailers system 260 may transmit other information (e.g., coupons, rebates, flyers, incentive/reward program information, etc.), to a user's mobile device 210 and/or user preferences database 600. Thus, by allowing a retailer to contact a consumer as described herein, particularly when the consumer may be in the vicinity of the retailer and/or may have stated an interest in their store, a retailer may service consumer requests, provide more targeted advertising, alert the consumer to last-minute events or specials, and/or provide information that is useful to their customers in an ad hoc manner. Conversely, a consumer's approach to, for example, shopping or some other activity, may be more enjoyable and less time-consuming.

Other services may be envisioned, for example, the interactive component of mobile device 210 may include a gift finder. In some instances, finding a gift for a loved one, a relative, a friend, or someone you work with, may be troubling. However, the process of finding a gift may be less burdensome if a user can place a request that a gift be located. For example, a user may input certain parameters, such as amount of money to spend, gender, the relationship of the individual to the user, etc. Based on this information, one or more possible gifts could be presented to the user (e.g., via mobile device 210). In one implementation, the information may include an image of the item, the price of the item, the store, etc.

Since other types of locations may be contemplated, variations to the above may be considered. For example, if a user is near a theme park or an amusement park, other types of information may be provided. For example, in addition to, for example, a map of an amusement park, type of rides, etc., a database may include ride information (e.g., age requirements, height requirements, real-time line wait times, etc.).

Although, FIG. 8 illustrates an exemplary processing procedure, in other implementations, fewer, additional, or different processes may be performed. For example, in relation to some services described herein, block 802 and/or block 804 may be omitted.

Figure 9B:
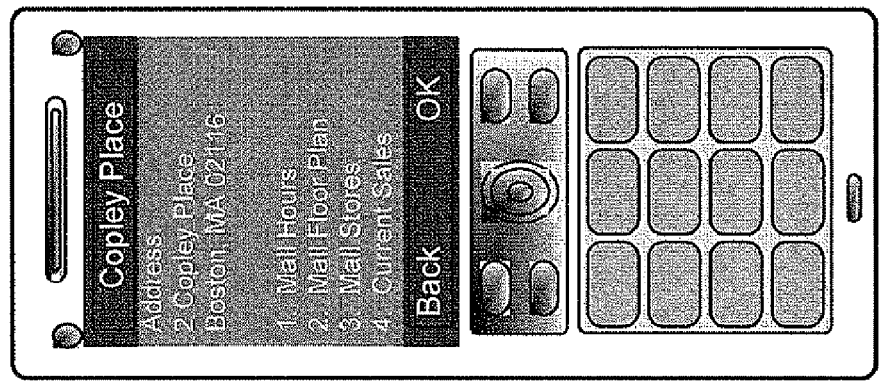
FIGS. 9A-9N are diagrams illustrating exemplary screenshots of a mobile device in accordance with the concepts described herein.
Figure 9A:
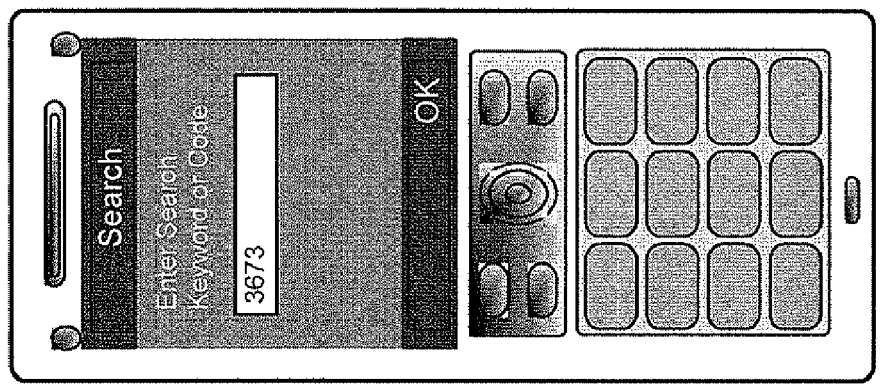
Figure 9H:
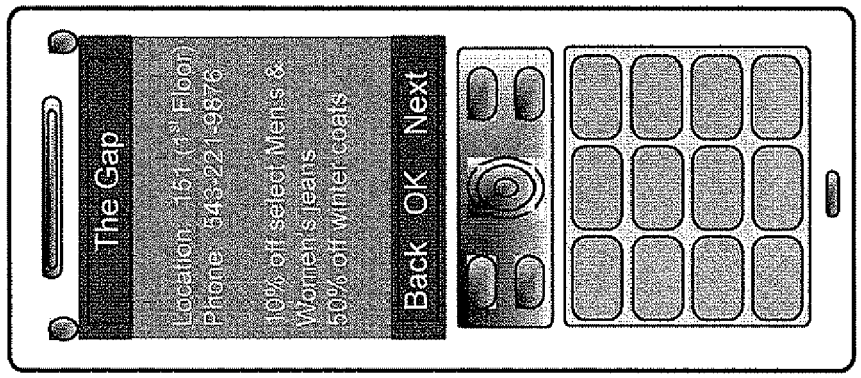
Figure 9G:
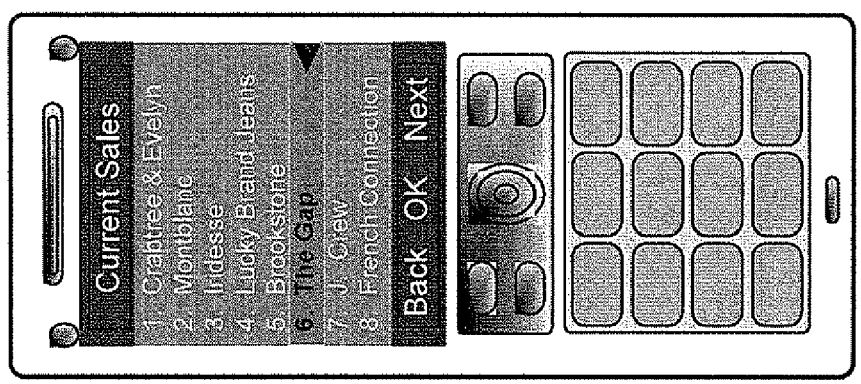
Figure 9I:
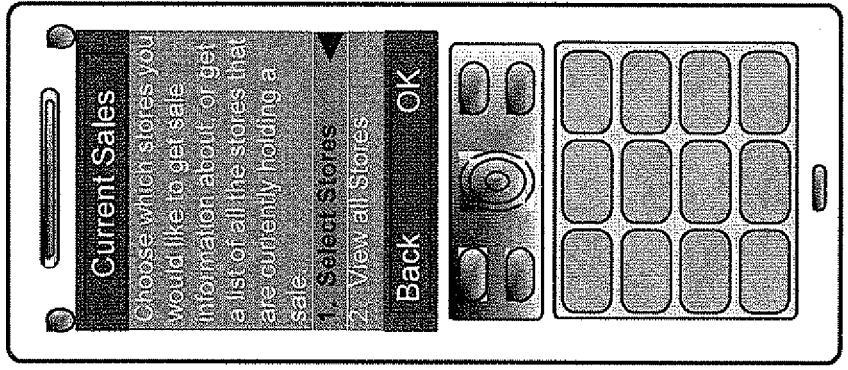
Figure 9J:
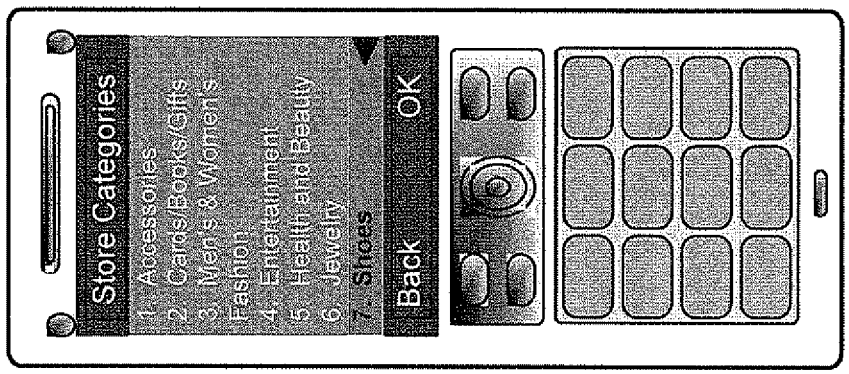
Figure 9K:
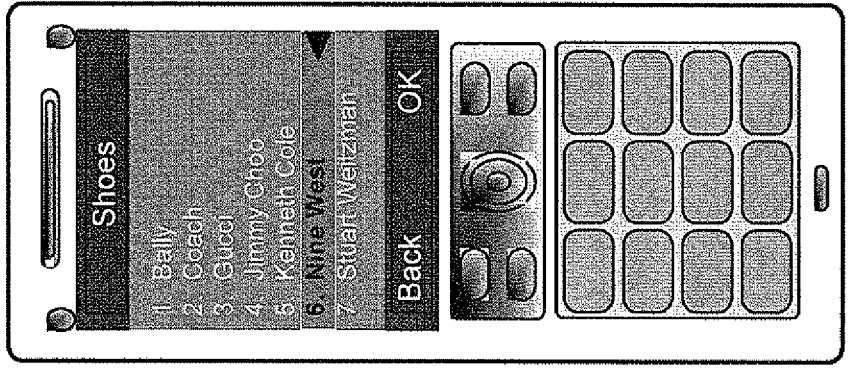
Figure 9N:
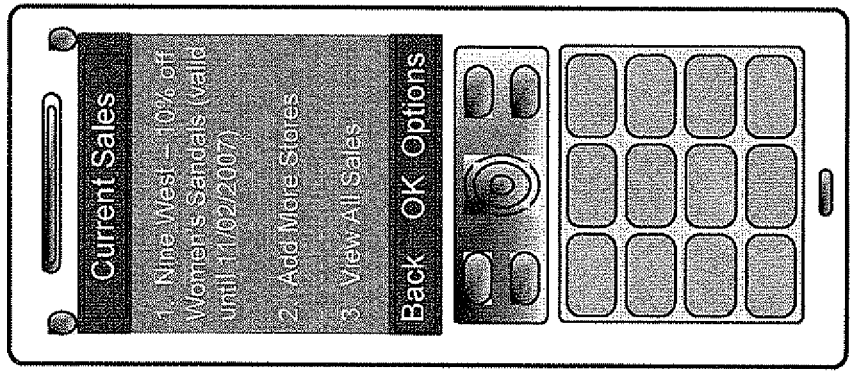

FIGS. 9A-9N are diagrams illustrating exemplary screenshots of a mobile device in accordance with the concepts described herein. For purposes of discussion, assume that a consumer plans to go to the mall. The consumer opens his/her mobile device 210 and navigates to the interactive component. By default, the interactive component may detect the consumer's location and may suggest a mall. However, as illustrated in FIG. 9A, the consumer may enter, for example, a mall code, such as "3673." In turn, as illustrated in FIG. 9B, the consumer may see the next screen that names the location, such as "Copley Place," an address, and a menu system that may include mall hours, a mall floor plan, mall stores, and/or current sales. As further illustrated in FIGS. 9C-9F, the consumer may select any one of the options from the menu to find additional information. For example, as illustrated in FIG. 9C, the consumer may discover the mall hours. Further, as illustrated in FIG. 9D, the consumer may be provided with a layout or a floor plan of the mall. The layout may be analogous to those that one would find in a kiosk and/or a directory. The consumer may be able to navigate through various floor levels. In one implementation, the consumer's position may be highlighted relative to the layout or floor plan so that the consumer may know his/her position relative to a store or other structure (e.g., an automated teller machine (ATM), a telephone, restrooms, etc.).

Further, as illustrated in FIG. 9E, a list of stores may be provided. In one implementation, the stores may be provided by category. In other implementations, the stores may be provided alphabetically, by floor, etc. As illustrated in FIG. 9F, the consumer may access a current sales page. In one implementation, a menu may allow a consumer to select a particular store to see what sales, if any, are taking place, or view all the stores that currently have sales going on. For purposes of discussion, assume that the consumer selects "View all Stores," as depicted in FIG. 9F. FIG. 9G illustrates a subsequent screenshot in which the consumer may be presented with a list of stores that may be having sales. The consumer may select a store from the list, such as "The Gap," and may be presented with current sale information for this store, as illustrated in FIG. 9H.

Figure 9M:
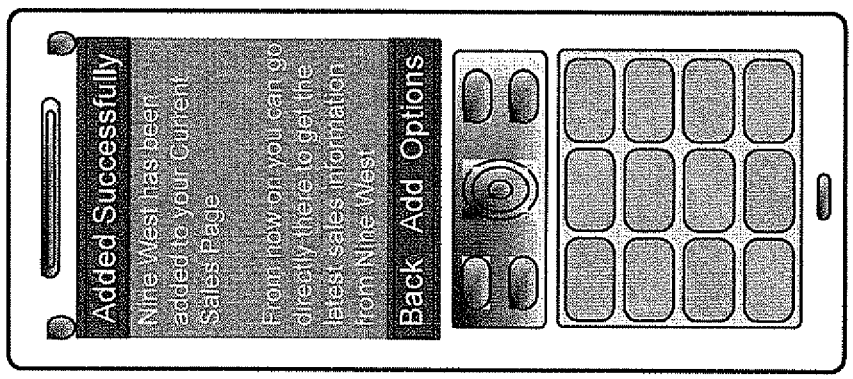
Figure 9L:
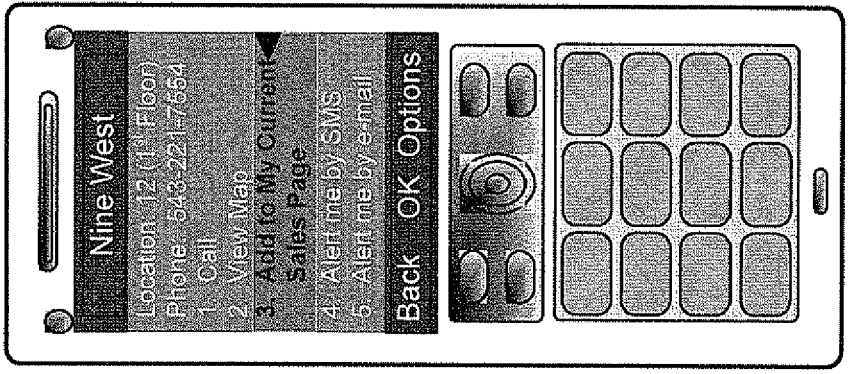

FIG. 9I-FIG. 9N illustrate exemplary screenshots related to how a consumer may add a favorite store to the Current Sales page. For example, as illustrated in FIG. 9I, a consumer may select from the menu "Select Stores" of the Current Sales page. From the Store Category page, a consumer may select "Shoes," as illustrated in FIG. 9J. As illustrated in FIG. 9K, a consumer may select a favorite store, such as "Nine West," from the Shoes page. From the Nine West page, a consumer may select from a menu to add a store (i.e., Nine West) to My Current Sales Page, as illustrated in FIG. 9L. Subsequently, as illustrated in FIG. 9M, a consumer may be told that Nine West has been added to their Current Sales page. Thereafter, if a consumer should access the Current Sales page, the consumer may be presented with current sale information at the consumer's favorite store, such as Nine West, as depicted in FIG. 9N.

Although FIG. 9A-FIG. 9N illustrate exemplary screenshots, in other implementation, fewer, additional, and/or different screenshots may be implemented. Additionally, one or more of the operations depicted in FIG. 9A-FIG. 9N may be implemented in a hands-free environment, such as by voice command. Additionally, or alternatively, the information illustrated in a screenshot may be provided to a consumer in an auditory manner.

The foregoing description of implementations provides illustration, but is not intended to be exhaustive or to limit the implementations to the precise form disclosed. In this regard, the concepts described herein may have broader application. For example, although the above description relates to a location, such as a mall, theme park or amusement park, the concepts described herein may relate to any location in which a user may wish to receive information about a location that may be in close proximity. Accordingly, the concepts described herein may be applied to other types of locations, for example, grocery stores, museums, or vacation spots. For example, if a user is in a large store, such as a Walmart or a Home Depot, a layout (e.g., an indoor floor plan) identifying where the inventory is located within the store may be helpful. Thus, depending on the location and circumstances, the layout may include, for example, an indoor floor plan or an outdoor floor plan. Accordingly, modifications and variations are possible in light of the above teachings or may be acquired from practice of the teachings.

In addition, while a series of blocks has been described with regard to a process illustrated in FIG. 8, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   identifying a location of a user based on a location of a mobile device associated with the user;
   identifying a location associated with a collection of entities, wherein each of the entities provides at least one of a retail-related service or an entertainment service;
   determining whether the collection of entities includes stores;
   associating the location of the user to the location of the collection of entities when a distance between the user's location and the location of the collection of entities is less than a user-specified distance;
   retrieving a layout identifying each of the entities and their respective location, wherein when the collection of entities includes stores, the layout includes at least one indoor floor plan that pertains to one of the stores and indicates where inventory is located within the one of the stores;
   receiving a user selection pertaining to the layout; and
   providing to the user, via the mobile device, the layout based on the user selection, wherein the associating comprises matching the location of the user to the location of the collection of entities in closest proximity to the user, wherein when the collection of entities corresponds to one of a mall including stores, a shopping district including stores, or a retail strip including stores, the retrieving comprises retrieving the layout that includes the at least one indoor floor plan pertaining to the one of the mall, the shopping district, or the retail strip, and wherein the retrieving comprises retrieving entities information that includes a listing of the stores, wherein the listing is alphabetical or by category; an address, a telephone number, and hours of operation for one or more of the stores; and current sales information for one or more of the stores; and the method further comprising:
   receiving another user selection pertaining to the entities information; and
   providing to the user, via the mobile device, one or more of the entities information based on the other user selection.

2. The method of claim 1, wherein the identifying comprises:
   transmitting, via the mobile device, a geographic address corresponding to the location of the collection of entities or an identifier corresponding to the location of the collection of entities.

3. The method of claim 1, further comprising:
   receiving a gift request, wherein the gift request includes gift parameters that include an amount of money to spend, the gender of a recipient, a relationship of the recipient to the user, and an occasion for a gift;
   searching for the gift based on the gift request, wherein the searching includes searching inventory associated with the collection of entities that includes stores; and
   providing to the user a gift result based on the searching.

4. The method of claim 3, further comprising:
   identifying the location of the mobile device relative to the indoor floor plan; and
   displaying the user's position relative to the indoor floor plan based on the identifying.

5. The method of claim 1, wherein the retrieving comprises:
   retrieving other entities information that includes driving directions to one or more of the stores; incentive and reward program information associated with one or more of the stores; and receipts of purchase associated with one or more of the stores; and the method further comprising:
   receiving a user selection pertaining to the other entities information; and
   providing to the user, via the mobile device, one or more of the other entities information based on the user selection.

6. The method of claim 1, wherein the retrieving comprises:
   retrieving other entities information that includes special services information; delivery information; a list of inventory available in stock; brands of inventory; images of inventory; prices of inventory; store credit card information associated with one or more of the stores; advertising information associated with one or more of the stores including sale information; coupons; rebates; special event information; two-for-one sale offers; delivery services; last visits; and previous purchases; and the method further comprising:
   receiving a user selection pertaining to the other entities information; and
   providing to the user, via the mobile device, one or more of the other entities information based on the user selection.

7. The method of claim 1, further comprising:
   receiving, via the mobile device, a picture of a bar code of an inventory item associated with one of the stores;
   searching for the inventory item, based on the bar code, in another one of the stores or one or more stores located in a location other than the location of the collection of entities; and
   providing to the user, via the mobile device, a search result that indicates whether the inventory item is available in the other one of the stores or the one or more stores.

8. The method of claim 1, further comprising:
   storing user preferences data pertaining to the user, wherein the user preferences data includes a list of names of user favorite stores; store code identifiers that indicate stores and collection of entities code identifiers that indicate collection of entities; notification preferences that include user preferences pertaining to opting-in or opting-out for receiving information from stores and a form of communication to be used when the user opts-in; the user specified distance; and workspace information that includes a list of items to be purchased, gift lists, wish lists, and receipts of purchases.

9. A tangible computer-readable medium having stored thereon instructions, executable by at least one processor, the tangible computer-readable medium comprising:
   one or more instructions for receiving a location of a mobile device;
   one or more instructions for identifying a location associated with a collection of attractions;
   one or more instructions for determining whether the collection of attractions includes stores;

one or more instructions for associating the location of the mobile device to the location having the collection of attractions when a distance between a user's location and the location of the collection of attractions is less than a user-specified distance;

one or more instructions for retrieving a layout identifying a name for each attraction and a location of each attraction within the collection, wherein when the collection of attractions includes stores, the layout includes at least one indoor floor plan that pertains to one of the stores and indicates where inventory is located within the one of the stores;

one or more instructions for receiving a user selection pertaining to the layout; and one or more instructions for providing the layout based on the user selection wherein the one or more instructions for associating comprises one or more instructions for matching the location of the user to the location of the collection of attractions in closest proximity to the user, wherein when the collection of attractions includes stores, the retrieving comprises retrieving entities information that includes a listing of the stores, wherein the listing is alphabetical or by category; an address, a telephone number, and hours of operation for one or more of the stores; and current sales information for one or more of the stores; and the tangible computer-readable medium further comprising:

one or more instructions for receiving a user selection pertaining to the entities information; and one or more instructions for providing to the user, via the mobile device, one or more of the entities information based on the user selection.

10. The tangible computer-readable medium of claim 9, wherein when the collection of attractions includes one of a mall, an amusement park, a theme park, or a museum, the layout includes an indoor floor plan for the mall or the museum and an outdoor floor plan for the amusement park or the theme park.

11. The tangible computer-readable medium of claim 9, further comprising:

one or more instructions for receiving a query from the mobile device for information related to the location having the collection of attractions;

one or more instructions for searching data related to the location having the collection of attractions based on the query, wherein the data includes driving directions to the collection of attractions; address information; contact information; and hours of operation, and wherein when the collection of attractions includes stores, the data includes inventory available in one or more of the stores; and wherein when the collection of attractions includes an amusement park, the data includes ride information; height requirements; age requirements; and wait times for lines to a ride; and one or more instructions for providing a search result to the user based on the searching and the query.

12. The tangible computer-readable medium of claim 9, further comprising:

one or more instructions for receiving user preference data from the mobile device, wherein the user preference data includes a list of names of user favorite stores; store code identifiers that indicate stores and collection of attractions code identifiers that indicate collection of attractions; notification preferences that pertaining to opting-in or opting-out for receiving information from stores and a form of communication to be used when the user opts-in; the user specified distance; and workspace information that includes a list of items to be purchased, gift lists, wish lists, and receipts of purchases; and one or more instructions for storing the user preference data.

13. The tangible computer-readable medium of claim 9, further comprising:

one or more instructions for receiving a query from the mobile device for information related to the location having the collection of attractions;

one or more instructions for searching data related to the location having the collection of attractions based on the query, wherein the data includes special services information; delivery information; a list of inventory available in stock, brands of inventory; images of inventory; prices of inventory; store credit card information associated with one or more of the stores; advertising information associated with one or more of the stores including sale information, coupons; rebates; special event information; two-for-one sale offers; delivery services; last visits; and previous purchases; and one or more instructions for providing a search result to the user based on the searching and the query.

14. The tangible computer-readable medium of claim 9, further comprising:

one or more instructions for receiving a picture of a bar code of an inventory item associated with one of the stores;

one or more instructions for searching for the inventory item, based on the bar code, in another one of the stores or one or more stores located in a location other than the location of the collection of attractions; and one or more instructions for providing to the user a search result that indicates whether the inventory item is available in the other one of the stores or the one or more stores.

15. The tangible computer-readable medium of claim 9, further comprising:

one or more instructions for receiving a gift request, wherein the gift request includes gift parameters that include an amount of money to spend, the gender of a recipient, a relationship of the recipient to the user, and an occasion for a gift;

one or more instructions for searching for the gift based on the gift request wherein the searching includes searching inventory associated with one or more collection of attractions that includes stores; and one or more instructions for providing to the user a gift result based on the searching.

16. The tangible computer-readable medium of claim 9, further comprising:

one or more instructions for identifying the location of the mobile device relative to the at least one indoor floor plan; and one or more instructions for displaying the user's position relative to the indoor floor plan based on the identifying.

17. A system, comprising:

one or more devices, wherein each device comprises one or more memories that store instructions and one or more processors to execute the instructions that configure the system to:

receive a location of a user based on a location of a mobile device, identify a location associated with a collection of attractions, determine whether the collection of attractions includes stores, associate the location of the user to the location having the collection of attractions based on a distance between the user and the collection of attractions, wherein the collection of attractions is related to at least one of shopping or entertainment, retrieve a layout associated with the collection of attractions based on the associating, wherein when the collection of attractions is an indoor mall, the layout includes an indoor floor plan of the indoor mall and one or more store floor plans associated with one or more stores included in the indoor mall, wherein the one or more store floor plans indicate where inventory is located, and wherein when the collection of attractions is an outdoor mall, the layout includes a street-level plan of the outdoor mall and one or more indoor store floor plans associated with one or more stores included in the outdoor mall, wherein the one or more indoor store floor plans indicate where inventory is located, receive a user selection pertaining to the layout, and provide the user-selected layout associated with the collection of attractions to the user via the mobile device based on the user selection, wherein when associating, the one or more processors to execute the instructions to:

match the location of the user to the location of the collection of attractions in closest proximity to the user, and wherein when the collection of attractions is the indoor mall or the outdoor mall, the one or more processors are configured to execute the instructions to:

retrieve entities information that includes a listing of the stores, wherein the listing is alphabetical or by category; an address, a telephone number, and hours of operation for one or more of the stores; and current sales information for one or more of the stores; and the one or more processors to execute the instructions to:

receive another user selection pertaining to the entities information; and provide to the user, via the mobile device, one or more of the entities information based on the other user selection.

18. The system of claim 17, wherein the system is further configured to:

permit a store that is one of the attractions to manage information relating to the store, and allow the user to query for information relating to the store.

19. The system of claim 17, wherein the layout includes one or more identifiers pertaining to one or more of automated teller machines, telephones, or restrooms, and the system is further configured to:

identify the location of the user relative to the user-selected layout, and provide the location of the user and the user-selected layout to the user via the mobile device, wherein the mobile device is able to display the user-selected layout and the location of the user.

* * * * *